PULSE REPEATER

Filed Sept. 14, 1950 4 Sheets-Sheet 1

INVENTOR
M. E. MOHR
BY
H. O. Wright
ATTORNEY

INVENTOR
M. E. MOHR
BY H. O. Wright
ATTORNEY

Feb. 12, 1952 M. E. MOHR 2,585,571

PULSE REPEATER

Filed Sept. 14, 1950 4 Sheets-Sheet 3

INVENTOR
M. E. MOHR
BY H. O. Wright
ATTORNEY

Feb. 12, 1952

M. E. MOHR 2,585,571

PULSE REPEATER

Filed Sept. 14, 1950

4 Sheets-Sheet 4

INVENTOR
M. E. MOHR
BY H. O. Wright
ATTORNEY

Patented Feb. 12, 1952 2,585,571

UNITED STATES PATENT OFFICE 2,585,571

PULSE REPEATER

Milton E. Mohr, Pacific Palisades, Calif., assignor to Bell Telephone Laboratories, Incorporated, New York, N. Y., a corporation of New York Application September 14, 1950, Serial No. 184,871

18 Claims. (Cl. 178—44)

This invention relates to pulse transmission systems and more particularly to regenerative repeaters therefor.

The use of pulse transmission systems in the field of electrical communication is well known and several of the system types have already found extensive commercial application. Such systems have been designated pulse code modulation, pulse position modulation and pulse frequency modulation. Briefly, the operation of these systems consists in representing the intelligence to be transmitted, i. e., telephone and/or television signals, by sequences of constant amplitude pulses in which only the timing of the pulses is critical, or simply, whether a pulse may be recognized as existing or not. In order to overcome transmission impairments of a pulse transmission line the process of regeneration is employed. That is, a regenerative repeater is used at intervals along the line which repeater is triggered by the incoming pulse and which then proceeds to generate a newly formed transmitted pulse which depends only upon the time of occurrence of the received pulse and not upon the shape thereof. Thus the systems are effective so long as each received pulse is capable of being identified even though it may be considerably misformed.

Heretofore, regenerative repeaters suitable for receiving a pulse which has been misformed or attenuated by passage over a long section of transmission line and for generating and transmitting a newly formed pulse have usually consisted of four-terminal vacuum tube circuits, usually of the positive feedback variety. In most cases they are rather complex and require considerable operating power which must often be supplied over the transmission line from a distant terminal station.

It is an object of the present invention to simplify the design and improve the performance of regenerative repeaters by employing negative resistance elements in simplified circuits.

Circuits having negative resistance properties are quite old, but interest in this field has increased greatly with the recent development of the semiconductor and other types of negative resistance. Many suggestions for using these elements as linear amplifiers have been proposed since they require no filament or cathode current and have therefore a much higher power efficiency than the vacuum tubes.

It is another object of the invention to obtain amplification of pulses with negative resistance elements.

It is a further object of the invention to improve the power efficiency of long distance pulse transmission systems of the types having many regenerative repeaters located therealong.

In the simple embodiments of the invention to be described, the transmission line which may be a wire pair or a coaxial line having inner and outer conductors, over which the pulses are to be transmitted takes the form of a single loop circuit having the operating power therefor fed around the loop from one terminal station. The two terminal unit repeaters comprise a negative resistance element with an associated capacitive reactance and an inductive reactance and are connected either in shunt across the loop circuit or in series therewith. The leading edge of an incoming misformed pulse triggers a unit repeater, which pulses, placing a newly formed pulse, or a regenerated pulse upon the transmission line.

It is a feature of the invention to cause the newly formed pulse to be transmitted in only one direction along the transmission line. This feature is realized in certain embodiments of the invention by combining two or more negative-resistance unit repeaters at one regeneration point so that the regenerated pulses of each of the unit repeaters will combine for transmission in one direction along the transmission line, but will cancel in the opposite direction therealong. In other embodiments of the invention the undesired pulse is suppressed by means of a particularly chosen rectifier circuit associated with the unit repeater at a regeneration point.

Another feature of the invention resides in the means for preserving the desirable matched impedance characteristic of the transmission line by arranging a plurality of negative resistance unit repeaters in the familiar T-section networks, $\pi$-section networks, or lattice-section networks, thereby making it possible to more readily adjust the characteristic impedance of the repeater.

The nature of the present invention, its various objects, features, and advantages will appear more fully upon consideration of the various specific illustrative embodiments embodying principles of the invention in various ways, shown in the accompanying drawings and the following detailed description of these embodiments.

Fig. 1 shows in electrical schematic diagram form a long-distance pulse transmission system having a plurality of negative resistance pulse-regenerative repeaters in accordance with the invention located therealong;

Fig. 2, given by way of illustration, is a typical current versus voltage characteristic of a current-controlled type negative resistance element of the type employed in the invention;

Fig. 3, given by way of illustration, is a typical current versus voltage characteristic of a voltage-controlled type negative resistance element of the type employed in the invention;

Figure 1:
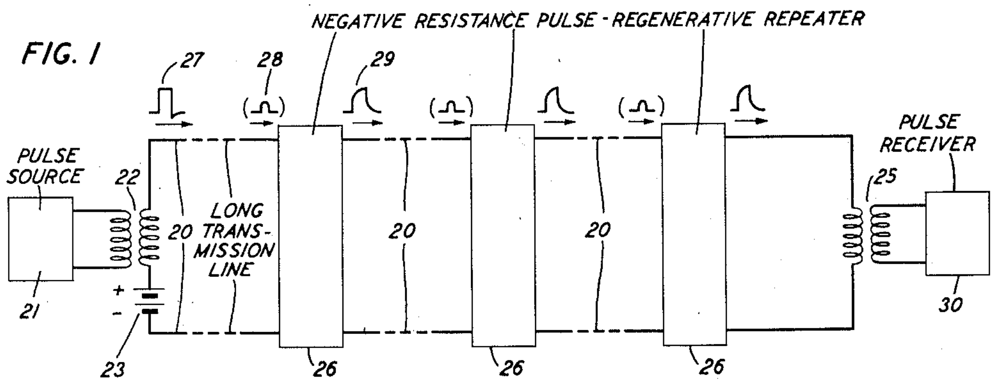

Referring to Fig. 1, a system illustrative of the types to be considered is shown. A source 21 of coded pulses to be transmitted to a distant pulse receiver 30 over a long distance transmission line 20 is connected through transformer 22 to one end of line 20 while pulse receiver 30 is connected through transformer 25 to the other end of line 20. A source of direct current potential 23 is connected at some point in the line to cause current to flow over the loop circuit thus obtained. Transmission line 20 may be any type of two-conductor line, for example, open wire line, cable line or coaxial conductor. A voltage pulse or a series of such pulses is placed on the line 20 at the transmitting end by source 21 through transformer 22, which pulses represent the coded intelligence to be transmitted. Such a pulse is represented in Fig. 1 by 27. Pulse 27 will travel toward the right along the line in a forward direction toward the receiving end of the line. Due to the inherent transmission impairments of line 20, pulse 27 will become attenuated, distorted and otherwise misformed after it has passed along a given section of the line 20. This effect is illustrated by pulse 28. Pulse 28 is still capable of being identified even though it is not of sufficient strength to withstand transmission over another section of line 20. Therefore, a negative resistance pulse-regenerative repeater in accordance with the invention, such as 26, is located at this point and at a plurality of other similarly spaced points along the line between the receiving and transmitting ends thereof. Each repeater 26 accepts the misformed pulse received by it and transmits a newly formed pulse, as for example, pulse 29, having the same timing as the misformed pulse, but of renewed amplitude and shape. This is the process now known in the art as regeneration of pulses.

Repeater 26 is a negative-resistance pulse-regenerative repeater of any of the types shown in Figs. 4 through 16 and to be described in detail hereinafter. Since an understanding of the operation of each of these various repeater circuits is closely related to a complete understanding of the characteristics of the negative resistance unit per se as employed in each repeater, it would seem desirable to first describe the characteristics of two types of negative resistance units.

Figure 2:
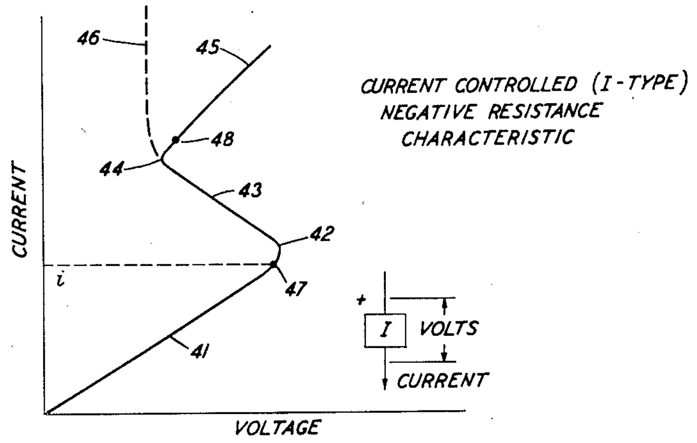

Certain of the characteristics of negative resistance elements have been known in the art for some time. In general, these negative resistance elements have been divided into two classes depending upon certain of their electrical characteristics. The first class has been designated the "series-type" or "current-controlled" negative resistance. The first name has been applied to this class because it exhibits the properties of an inductive reactance connected in series with a pure negative resistance as the frequency of the applied power approaches that frequency at which the negative resistance component becomes zero. The second name or "current-controlled" resistance (hereinafter designated "I-type" for convenience) is more appropriate for the present explanation and has been used to define this type of negative resistance because the current versus voltage characteristic of the element is similar to a two-terminal device with an internal source of energy controlled solely by the current through the terminals. This characteristic is shown in Fig. 2. As the current is increased from zero, over a portion 41 of the characteristic of Fig. 2, the element exhibits a positive resistance characteristic with the voltage across the element increasing in substantially direct proportion to the current. When the current exceeds a certain value, the current versus voltage characteristic changes to a negative slope forming knee 42 of the characteristic. Thus the voltage across the element becomes smaller as the current is further increased in the portion 43 of the Fig. 2. It is to this portion 43 of the characteristic that the term "negative resistance" was originally applied. As the current is further increased, the current versus voltage characteristic again becomes positive forming a second knee 44, and remains thus as the current is increased to infinity in portion 45 of the characteristic of Fig. 2. The significance of the broken line 46 will be explained hereinunder.

Figure 3:
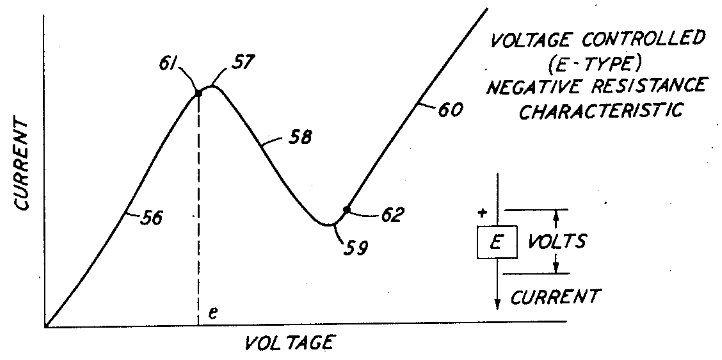
Figure 4:
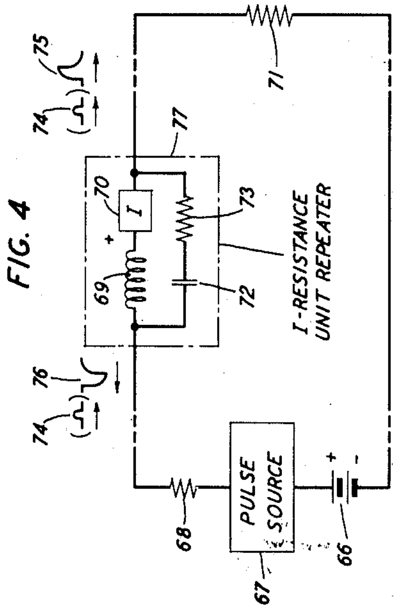
Fig. 4 shows in electrical schematic diagram form a basic current-controlled type of regenerative unit repeater in accordance with the invention.

The second class of negative resistance elements has been designated the "shunt-type" or "voltage-controlled" negative resistance (hereinafter designated "E-type" for convenience). The first name applies to this class since it exhibits the electrical properties of a capacitative reactance connected in shunt across a pure negative resistance. The application of the name "voltage-controlled" resistance will be obvious upon examination of the current versus voltage characteristic of the E-type negative resistance as shown in Fig. 3. As the voltage is increased from zero, over a portion 56 of characteristic as shown in Fig. 3, the element exhibits a positive resistance characteristic with the current increasing in substantially direct proportion to the voltage. When the voltage is increased past a certain point, however, the slope of the characteristic becomes negative forming knee 57. The current decreases over a portion 58 of the characteristic as shown in Fig. 4, as the voltage is further increased. When the voltage is increased beyond a second point, at knee 59, a portion 60 of the characteristic as shown in Fig. 3, again has a positive slope exhibiting the properties of a positive resistance.

For a more extended discussion of each of these types of negative resistance and the characteristics obtained when each is incorporated in certain well-known circuits reference may be had to an article entitled "Negative Resistance and Devices for Obtaining It," by E. W. Herold in the proceedings of the Institute of Radio Engineers, October 1935, at page 1201.

For example, the current-controlled characteristic of Fig. 2 herein is shown by Herold in Fig. 2*b* on page 1205 and the voltage-controlled characteristic of Fig. 3 herein is shown in Fig. 2*a*. Suitable well-known circuits producing each type of characteristic are discussed by Herold beginning on page 1209. A further prior art illustration of a circuit producing an E-type negative resistance characteristic of the general type shown in Fig. 3 is disclosed, for example, in Patent 1,776,310, granted September 23, 1930, to G. Crisson and another in Patent 1,313,187, granted August 12, 1919, to A. W. Hull.

The recently developed semiconductors, known as thermistors and varistors, disclosed, for example, in Patent 2,276,864, granted March 17, 1942 to G. L. Pearson, exhibit substantially the I-type negative resistance characteristic of Fig. 2. Usually these semiconductors are shown as having a characteristic above the upper knee 44 as represented by broken line 46 of Fig. 2, since the characteristic in some instances does not return to a positive slope until an exceedingly high current is reached. A suitably chosen positive resistance, however, included in series with the negative resistance element will cause the characteristic of the combination to follow a course such as that indicated by line 45, above the knee 44.

Reference may now be had to Fig. 4, where in one embodiment of the basic negative resistance pulse regenerative repeater is shown in diagram schematic diagram form. This circuit is, as shown, a series loop comprising a direct-current potential source 66, a source of pulses 67, a source resistance 68 (which represents schematically the internal resistances of potential source 66 and pulse source 67), inductance 69, a current controlled or I-type negative resistance element 70, and a load resistance 71. The series combination of capacitor 72 and resistance 73 is shunted across inductance 69 and element 70 as shown. The elements enclosed in box 77 make up an I-type negative resistance unit repeater, while load 71 represents the impedance of the transmission line circuit in the direction of the receiving end, and 66, 67 and 68 simulate in schematic representation the transmitting end of the system. As shown in Fig. 1, an over-all circuit of the invention can include a plurality pulse-regenerative repeaters, successive repeaters being interconnected by long sections of transmission line. Obviously, only the first repeater is triggered by pulses from the sending end pulse source 21 of Fig. 1, or 67 of Fig. 4, the other repeaters being triggered by the new pulse generated at the next preceding repeater in the line.

Element 70 can be an I-type negative resistance of any of the kinds described in the foregoing publications or patents and has a current versus voltage characteristic 41, 43 and 45 as shown in Fig. 2. Inductance 69 may be considered to include in part any inherent inductive reactance of unit 70. Voltage source 66 and unit 70 should be connected in the circuit as indicated with their positive terminals toward each other.

Resistance 73, capacitor 72, inductance 69, and negative resistance element 70 make up a circuit having oscillatory properties. The electrical characteristics of such a circuit are extremely complicated because of the presence of the negative resistance 70 and are not easily represented by simple mathematical expressions. Rather they are accurately pictured only by means of three-dimensional graphical analysis. Under certain conditions the circuit will be stable, under others it will produce sinusoidal oscillations, and under others it may generate relaxation vibrations. Each of these conditions of an oscillatory circuit including a negative resistance element is treated, for example, by Walter Reichardt in two papers appearing in Elektrische Nachrichten-Technik, "Negative Resistances, Their Characteristics and Effects, Sinusoids, Relaxation Oscillations and Relaxation Discontinuities," March 1943, pages 76 through 87, and "Uniform Relationship Between Sinusoids, Relaxation Vibrations and Relaxation Discontinuities," September 1943, pages 213 through 225.

For the purposes of discussing the I-type unit repeater of Fig. 4, it will be sufficient to state that the design of the circuit should be made such that the dynamic or alternating-current resistance of the external circuit facing the negative resistance 70, that is the total resistance shunting element 70, will be positive and less than the absolute value of the negative resistance 70. Under this condition a quantitative analysis of the operation of the circuit of Fig. 4 may be given which will be sufficient for a reasonably complete understanding and for putting into practice the principles of the invention, but it should be understood that this analysis does not give a complete account of all phenomena occurring in the circuit. If a more complete analysis of stability of the curcuit under various conditions is desired, reference should be had to the aforementioned publications.

Considering Fig. 4 now in connection with Fig. 2, the I-type resistance 70 is initially biased by a direct current flowing from source 66 through the loop circuit to a point 47 of stable operation on the positive portion 41 of the characteristic as shown in Fig. 2, slightly below the knee 42 of the curve. A direct-current of value $i$ (Fig. 2) will flow through element 70. There will be a corresponding direct-current voltage drop across element 70, to which voltage, condenser 72 will charge at steady state.

Now assume that pulse source 67 forces an instantaneous increase in current through the loop. This will cause a positive current pulse 74 to travel to the right from source 67 toward the negative resistance element 70. Upon reaching element 70, the effect of pulse 74 may be thought of as the momentary shifting of the operating point 47 (Fig. 2) upward and around the knee 42 of the curve. This places the operating point in the negative resistance range 43 of the characteristic. The voltage across element 70 will decrease, causing condenser 72 to discharge. This further increases the current through and decreases the voltage across, element 70. The action is cumulative, and very quickly element 70 will be driven to a point such as 48 (Fig. 2) on the second positive portion 45 of the characteristic, causing a momentary increase in the total loop current. The discharge current from condenser 72 has been developing, during the above-described interval, a voltage across inductance 69 of such polarity as would tend to prevent a decrease in the voltage across element 70, but when condenser 72 discharges to the net voltage across unit 70, this inductive voltage across inductance 69 will be zero since there is no longer a current discharge from condenser 72.

As a result of the effect of the oscillatory circuit, condenser 72 must begin to recharge, reversing the voltage across inductance 69 and decreasing the net current through element 70. The resultant effect of the combined action of decreasing current through element 70 and the fact that the voltage across element 70 cannot increase but must, if anything, decrease because of the action of inductance 69, will be that element 70 must suddenly shift from point 48 to a stable operating point on the portion 41 of the characteristic. This ends the momentary increase in the loop current. The duration of the increase depends directly for its timing upon the combination of the resistance, inductance and capacity in the above-described oscillatory circuit.

Restated in general terms it may be said that the initial pulse 74 triggers unit repeater 77, which repeater comprises the negative resistance element 70 and its related components, causing the resistance of 77 in the loop circuit to suddenly decrease allowing a momentary increase in the loop current around the circuit. Then after an interval determined by the oscillatory circuit components, the resistance of unit repeater 77 will again increase, simultaneously decreasing the loop current. The circuit then relaxes back to its initial condition at point 47 as the condenser 72 recharges.

The pulse 74 which causes this cycle of operation, commonly known as the trigger pulse, and new pulses 76 and 75 produced thereby are shown on Fig. 4. The triggering pulse 74 is represented in the parentheses traveling toward the right both before and after the pulsing circuit since after it performs the triggering operation it will pass on by repeater 77. The newly generated pulses caused by the sudden increase in current are represented by a positive voltage pulse 75 traveling in the "forward" direction (to the right) from the pulsing unit 77 and by a negative voltage pulse 76 traveling in the "backward" direction (to the left) of the pulsing circuit 77.

The combination 77 of the series-type negative resistance 70 connected in series with the inductance 69, and shunted by the series combination comprising condenser 72 and resistance 73, as shown, thus serves as a pulse-regenerative unit repeater which, when connected in series in a transmission loop, will transmit a positive voltage pulse 75 in the forward direction and a negative voltage pulse 76 in the backward direction upon being triggered. It should now be apparent that the newly produced pulses 75 and 76 are independent of the triggering pulse 74 except for the initial starting time. This is true since the function of the triggering pulse 74 is to raise the operating point of the negative resistance element from the positive slope portion 41 of the characteristic to the negative slope portion 43. Thus the amplitude of the pulse 74 need only be large enough, i. e., the difference between the voltage at point 47 and point 42 on the characteristic of Fig. 2, to shift operation around the knee 42 of the curve. If the bias on element 70 is such that point 47 falls very near point 42, the required triggering pulse amplitude is correspondingly small. After triggering, the operation of the circuit 77 is independent of the trigger pulse 74, therefore nothing further is required of the pulse with regard to shape, time of duration or other considerations.

In view of the foregoing explanation it should be apparent that a repeater responsive to a negative pulse would result if the initial bias current were chosen at a point such as 48 on the second positive portion 45 of the characteristic of Fig. 2. Under such conditions the operation would be substantially the converse of that heretofore described.

Figure 5:
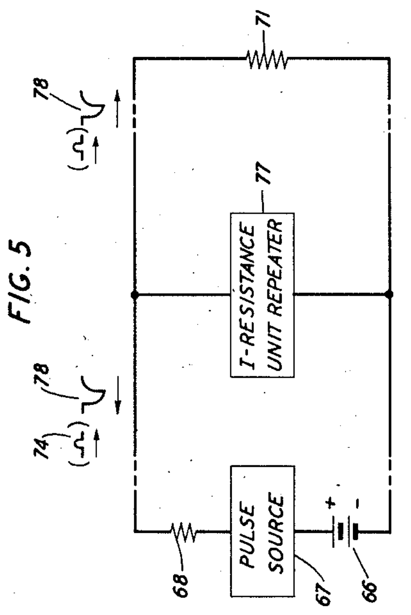
Fig. 5 shows in electrical schematic diagram form a second embodiment of the regenerative repeater of Fig. 4.

In Fig. 5 the negative resistance unit repeater 77 is connected in shunt across the transmission loop, i. e., in parallel with load resistance 71 rather than in series as shown in Fig. 4. Under this condition a negative voltage pulse 78 would be transmitted in both the forward and the backward directions from the unit repeater 77. This is readily seen if the I-type negative resistance unit repeater 77 is thought of simply as an element, the resistance of which decreases momentarily upon being triggered. When connected in shunt such a decrease in the effective resistance of 77 will decrease the loop current flowing in the portion of the circuit following the repeater, i. e., through load resistance 71, thus causing a decrease in voltage across the line in that portion following repeater 77. Further it would increase the loop current flowing in that portion of the circuit preceding the repeater, thus causing a negative pulse to appear across the line in that portion preceeding the repeater 77.

Figure 6:
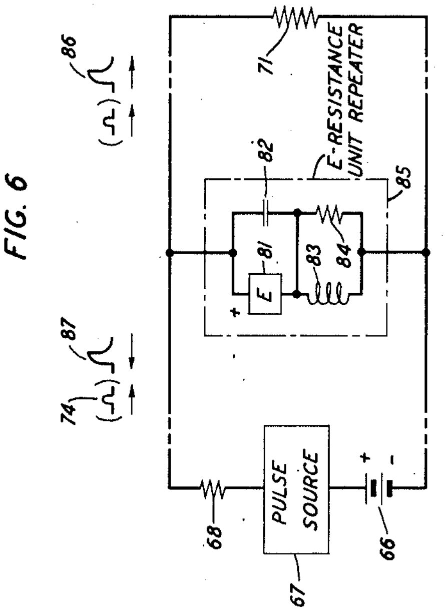
Fig. 6 shows in electrical schematic diagram form a basic voltage-controlled type of regenerative unit repeater in accordance with the invention.

Referring now to Fig. 6, a circuit is shown in which an E-type or voltage controlled negative resistance 81 is employed with associated circuit components to form a regenerative unit repeater 85. Using corresponding reference numerals heretofore employed to represent identical components, the loop circuit may be seen to comprise a direct-current potential source 66, a pulse source 67, a source resistance 68, and a load resistance 71. Connected in shunt across the loop circuit or in parallel with load resistance 71 is unit repeater 85 which comprises an E-type negative resistance element 81 connected in series with inductance 83. Element 81 is shunted by condenser 82, which may be schematically considered to include the inherent shunt capacitative reactance of element 81. A resistance 84 is connected in parallel with inductance 83. Similar to Fig. 4 heretofore discussed, the repeater 85 of Fig. 6 comprises an oscillatory combination of resistance 84, inductance 83, capacity 82, and having negative resistance element 81 connected across the capacity 82.

The operation of the circuit of Fig. 6 may be analyzed in connection with the characteristic shown in Fig. 3 in which the electrical characteristics, heretofore discussed, of E-type resistance 81 are shown.

In this case it will be sufficient, for the purposes of this discussion, to state that the design of the circuit should be made such that the dynamic or alternating-current resistance of the external circuit facing the negative resistance element 81, or the total resistance shunting element 81, will be positive and greater than the absolute value of the negative resistance 81. On this basis a quantitative analysis of the operation of the circuit of Fig. 6 may be given which will be sufficient for a reasonably complete understanding and for putting into practice the principles of the invention, but it should be understood that this analysis does not give a complete account of all phenomena occuring in the circuit.

The direct-current flowing from source 66 through element 81 is adjusted so that element 81 is biased to operate upon the portion 56 of the current versus voltage characteristic of Fig. 3 and at a point 61 slightly below the knee 57. Under this condition of operation a voltage $e$ (Fig. 3) will be developed across element 81 to which voltage condenser 82 will charge at steady state.

The input pulse 74 introduced by source 67 may be thought of as providing a small increase in voltage across element 81 which causes the operating point 61 to shift to the right, over the knee 57 of the characteristic of Fig. 3 to some point on the negative portion 58 of the characteristic. This causes the current through unit 81 to suddenly decrease and results in an increase in voltage across condenser 82 which in turn causes a further decrease in current through element 81. As was the case with the I-type negative resistance unit repeater of Fig. 4, this action is cumulative and results in a rapid decrease in current through element 81 until a point such as 62 on the positive portion 60 of the characteristic of Fig. 3 is reached. Because of the oscillatory action of inductance 82 and condenser 82, operation is suddenly shifted from point 62 back to a stable point on the portion 56, of the characteristic, with a corresponding sudden decrease in voltage across element 81. From this point the current gradually builds up as condenser 82 charges again to the initial operating point 61.

Since this action will increase the loop current through resistance 71 and the portion of the circuit following repeater unit 85, and since it will simultaneously decrease the loop current in that portion of the circuit preceding repeater unit 85, a positive voltage pulse 86 is transmitted in the forward direction and a positive voltage pulse 87 is transmitted in the backward direction from the repeater unit 85 when the repeater is triggered. This is due to the fact that triggered element 81 momentarily draws less current, forcing more current through the load resistance 71 and less current through source resistance 68.

It should now be apparent that a repeater responsive to a negative pulse would result if the initial bias current were chosen at a point such as 62 on the second positive portion 60 of the characteristic of Fig. 3. Under such conditions the operation would be substantially the converse of that heretofore described.

Figure 7:
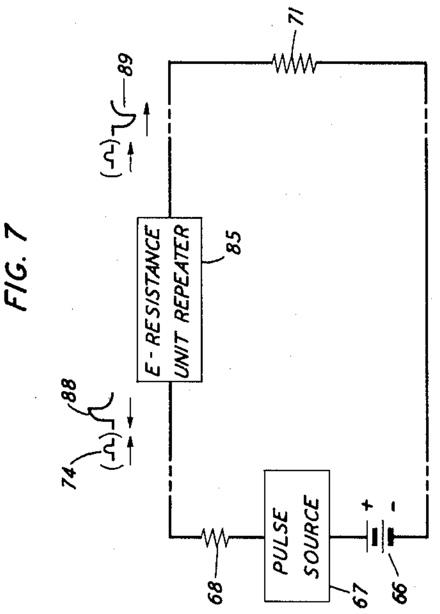
Fig. 7 shows in electrical schematic diagram form a second embodiment of the regenerative repeater of Fig. 6.

In Fig. 7 unit repeater 85, comprising E-type element 81 and its associated reactive components, is placed in series with the transmission loop or in series with load resistance 71. It should now be readily seen that a negative voltage pulse 89 would be transmitted in the forward direction toward load resistance 71, while a positive voltage pulse 88 would be transmitted in the backward direction toward the source 67.

Thus far, four possible unit repeater circuits have been disclosed employing the characteristics of negative resistance elements to produce regenerated pulses. The first, as shown in Fig. 4, comprised an I-type negative resistance unit repeater 77 connected in series in the transmission loop and was shown to produce a positive pulse 75 in the forward direction and a negative pulse 76 in the backward direction upon being triggered. The second, as shown in Fig. 5, comprised an I-type negative resistance unit repeater 77 connected in shunt with the transmission loop and was shown to produce a negative pulse 78 in both directions. The third, as shown in Fig. 3, comprised an E-type negative resistance unit repeater 85 connected in shunt across the transmission loop and was shown to produce positive pulses 86 and 87 traveling in both directions along the transmission loop. Finally, the fourth circuit as shown in Fig. 7, comprised the E-type negative resistance unit repeater 85 connected in series with the transmission loop and was shown to produce a negative pulse 89 in the forward direction and a positive pulse 88 in the backward direction upon being triggered.

If a plurality of any one of these types or a combination of these types were connected along a transmission loop, as in the system of Fig. 1, between a transmitting point and a remote receiving point, each unit repeater would serve to regenerate a pulse which reaches it by transmitting a newly formed pulse in the forward direction to the next repeater. Since each repeater also transmits a pulse in the backward direction, certain limitations are imposed on the spacing and speed of operation of the repeaters in order to prevent interference by the back traveling pulse.

It is, of course, desirable that each repeater shall be capable of operating in response to a pulse after it has been attenuated and misinformed by one section of the line. Further, since each repeater transmits a pulse in each direction, each repeater must be disabled at the time the pulse returns from the next succeeding repeater. To realize this requirement, each repeater can be disabled, after a pulse is transmitted, for the period of time required for the pulse to reach the next repeater and return to the preceding or originating repeater. Finally, if each repeater is not to operate on the backward traveling pulses from the second succeeding repeater, each repeater should not operate in response to a pulse attenuated by two sections of line. Although these requirements are not prohibitive to the use of such a repeater system, they do impose certain limitations upon the pulsing speed and spacing between the repeaters.

In accordance with one aspect of the invention to be immediately described with reference to several embodiments, these limitations on the operation of a system are greatly reduced by substantially eliminating or suppressing the backward transmitted pulse. In this case, the speed of operation of each repeater is limited only by the required transit time of the repeater. The lower limit of pulse amplitude operation then becomes dependent only upon the noise level and the stability limit of the repeater, since it is only necessary that the repeater should operate reliably on a pulse attenuated by one section of line. These desirable broadened requirements are realized from the repeater systems shown by way of example, in the electrical schematic diagrams of Figs. 8 through 15, inclusive.

Figure 8:
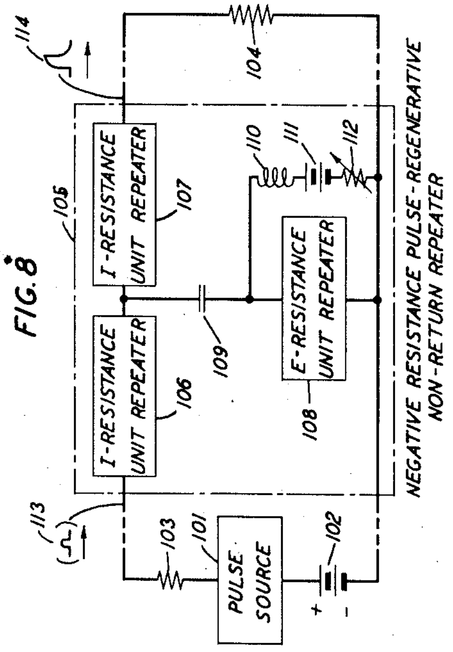
Fig. 8 is an electrical schematic diagram of a "non-return" regenerative repeater in accordance with one feature of the invention.

Referring to the electrical schematic diagram of Fig. 8, a "non-return" pulse repeater is shown which will transmit a pulse only in the forward direction along a transmission line from the repeater without transmitting a return pulse, or a pulse in the backward direction, from the repeater.

Using the simplifications employed in the previous figures for the purpose of explanation, the system is represented in Fig. 8 by a pulse source 101 in series with a potential source 102 and a resistance 103, the three series units representing the transmitting end of the system, connected across one end of a two-conductor line. A load resistance 104, representing the impedance of the receiving end of the system, is connected across the other end of the line.

Non-return repeater 105 is connected at a location intermediate the respective line ends and comprises two I-type negative resistance unit repeaters 106 and 107, each of the type disclosed in box 77 of Fig. 4 and an E-type negative unit repeater 108 of the type shown in box 85 of Fig. 6. Repeater units 106 and 107 of Fig. 8 are connected in serial relation in one side of the transmission loop, and repeater unit 108 is connected in shunt across the loop, at a point between units 106 and 107, through condenser 109. The I-type unit repeaters 106 and 107 are biased to the value indicated hereinbefore with reference to Figs. 2 and 4 by means of current flowing from source 102 through the series loop circuit.

The E-type unit repeater 108 is biased to the value hereinbefore defined with reference to Figs. 3 and 6. For the purpose of illustration, unit repeater 108 is shown biased by a separate local potential source 111, but it should be understood that suitable circuits may readily be designed by those skilled in the art to supply the bias current for repeater 108 over the line from source 102. On the other hand, the bias of the units 106 and 107 could be supplied by a local source, if desired. As illustrated, therefore, the bias supply for unit 108 comprises the serial combination of variable resistance 112 to regulate the bias current through unit 108, pulse blocking choke 110 and source 111 connected across unit repeater 108. Condenser 109 is chosen to provide a low impedance to the pulses while blocking the direct current from source 111 and from source 102. Choke 110 is chosen to have a high impedance to the pulses and a low impedance to direct current from bias source 111.

The operation of the non-return repeater of Fig. 8 may most easily be understood if the presence of one of the I-type units is neglected for the moment. Assume, therefore, that only units 107 and 108 are effective and that unit 106 has been short-circuited. An input pulse, such as 113, will trigger both the I-type unit 107 and the E-type unit 108 substantially simultaneously in the manner already described with reference to the separate consideration of each type of unit in connection with Figs. 4 and 6, respectively. The effective resistance in the loop circuit of unit 107 will momentarily decrease, allowing an increase in loop current to flow through load 104. As has been described, this results in a positive pulse, such as 114, being transmitted in the forward direction. At the same time, however, the effective resistance of unit 108, connected in shunt across the loop, will increase, tending to cause less current to flow from source 102 through the shunt path. Thus, the decrease in current drawn from source 102 by unit 108 will compensate the increase in current drawn by the action of unit 107 with a net result that no change in current will appear in that portion of the circuit preceding non-return repeater 105, and that an increase in current will appear in that portion of the circuit including load 104 following repeater 105. Another way of considering the action of the non-return repeater of Fig. 8 in terms of voltage pulses, may be seen with reference to the pulses produced by the unit repeaters of Figs. 4 and 6. Thus, an I-type unit, as in Fig. 4, connected in serial relation to the line, produces a negative pulse in the backward direction, while an E-type unit, as in Fig. 6, connected in shunt with the line, produces a positive pulse in the backward direction. With the combination in accordance with the invention, as shown in Fig. 8, the backward pulses, from unit 108 cancel those from unit 107, while the forward pulses, which are positive from both types of units, will combine.

The network thus far described, neglecting the presence of unit 106, is in the form of the familiar L-type impedance network, or L-section network, with unit 107 forming one branch and unit 108 forming the other. However, it is usually desirable in most communication systems that symmetrical impedance matching conditions be maintained along the line, and for this reason, the more complex network structures have been developed, known, for example as the T-section, the $\pi$ section and the lattice-section. The relation between, and the transformation equations for going from one type of network to another, may be found fully developed in any standard text on network theorems. The present networks are, of course, non-linear, since the elements contained therein change with the magnitude of the applied voltage or with the current strength. Thus, the network, as shown on Fig. 8, is a T-section, the I-type unit repeaters being in effect divided in accordance with the usual transfer theorem into the two halves represented by 106 and 107.

Figure 10:
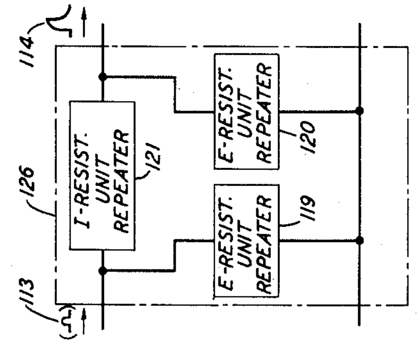
Figs. 9 and 10 show in electrical schematic diagram form permissible alternative configurations of the "non-return" repeater of Fig. 8.
Figure 9:
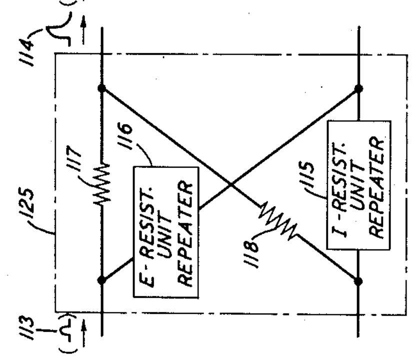

Alternative impedance matching network configurations are also entirely practicable, and two of these are shown in Figs. 9 and 10.

In Fig. 9, a negative resistance pulse regenerative repeater 125 is shown which may replace repeater 105 in the circuit of Fig. 8. Repeater 125 comprises, as shown in Fig. 9, a single I-type negative resistance unit repeater 115 and a single E-type negative resistance unit repeater 116 arranged in a lattice configuration. Impedance 117 is serially connected in the transmission line opposite unit 115 and is chosen to have an impedance which will balance during the non-pulsing condition of the impedance of unit 115. In like manner, impedance 118 balances the impedance of unit 116. In Fig. 10, a $\pi$-type network negative resistance pulse regenerative repeater 126, which may replace repeaters 105 or 125, is shown. Repeater 126 comprises two E-type negative resistance unit repeaters 119 and 120 connected in shunt across the loop, located on either side of the I-type negative resistance unit repeater 121 which is serially connected in the loop. Conversion from one network to another is made in accordance with the usual theorems mentioned hereinbefore.

Figure 11:
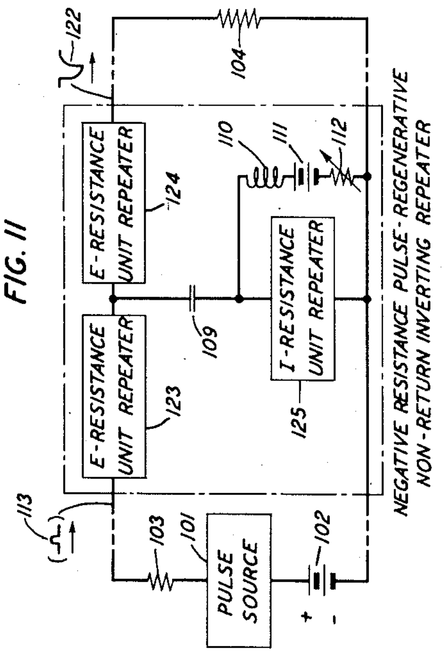
Fig. 11 is an electrical schematic diagram of a "non-return" "inverting" repeater in accordance with a further feature of the invention.

Fig. 11 shows, in schematic diagram form, a system substantially similar to that of Fig. 8, and corresponding reference numerals have been used to designate similar components. The repeater 121, is however, a "non-return" "inverting" repeater which, upon being triggered by a positive pulse 113, will transmit a negative pulse 122 only in the forward direction. Comparison with Fig. 8 will show that the relative positions of the I-type unit repeater 125 and the E-type unit repeaters 123 and 124 have been interchanged. That is, in Fig. 11, the E-type negative resistance unit repeaters 123 and 124 are now connected in serial relation in the transmission loop, while the I-type negative resistance unit repeater 125 is connected in shunt across the loop. As in Fig. 8, for the purpose of impedance matching, the E-type units have been divided into two portions in order to form a T-section impedance network.

Upon being triggered, the arrangement as shown in Fig. 11 will transmit a negative pulse 122 in the forward direction and no pulse in the backward direction in the following manner. The pulse 113 received from source 101 will trigger both the I-type unit 125 and the E-type units 123 and 124. The momentary increase of the effective resistance of E-type units 123 and 124 will decrease the loop current flowing in both the portion preceding the non-return repeater 121 and the portion following repeater 121. The decrease of the effective resistance of the I-type unit repeater 125 will increase the current flowing in the portion of the line preceding repeater 121 and will decrease the current in the portion following repeater 121. Thus, the effect in the backward direction due to one type of unit repeater connected in shunt will cancel the effect due to the other connected in series, while the effect in the forward direction of each will combine to produce a negative pulse 122.

It is thus seen that the repeater 121 of Fig. 11 inverts the polarity of the pulse which it regenerates. In certain of the pulse transmission systems heretofore designed, it has been found advantageous to have the pulses in successive line sections of opposite polarity. The advantages gained stem directly from some of the complicated multiplex schemes used in these systems; and although any further discussion of these systems is not believed to be within the scope of the present disclosure, it should be pointed out that the repeater of Fig. 11 is ideally suited for regenerative operation in many systems requiring that the regenerative repeater reverse the polarity of the pulse before retransmission.

As in Figs. 9 and 10 hereinbefore described, the T-section network of the non-return inverting repeater of Fig. 11 may be transformed into lattice and $\pi$-type impedance sections.

Figure 12:
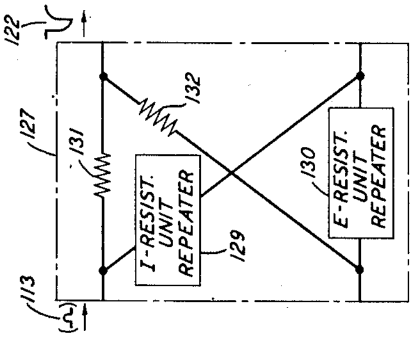

The resulting lattice section type pulse regenerative repeater 127, which may replace repeater 121, is shown in schematic diagram form in Fig. 12. Repeater 127 comprises an E-type negative resistance unit repeater 130 serially connected in the transmission line and an I-type negative resistance unit repeater 129 connected in shunt across the line. Impedance 131 is serially connected in the transmission line opposite unit 130 and is chosen to have an impedance which will balance during the non-pulsing condition the impedance of unit 130. In like manner, impedance 132 balances the impedance of unit 129.

Figure 13:
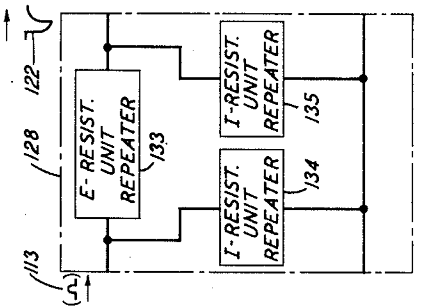
Figs. 12 and 13 show in electrical schematic diagram form permissible alternative configurations of the repeater of Fig. 11.

The resulting $\pi$-type section pulse-regenerative repeater 128, which may replace repeater 121 or repeater 127, is shown in schematic diagram form in Fig. 13. Repeater 128 comprises two I-type negative resistance unit repeaters 134 and 135 connected in shunt across the loop, located on either side of an E-type negative resistance unit repeater 133 which is serially connected in the loop.

Figure 14:
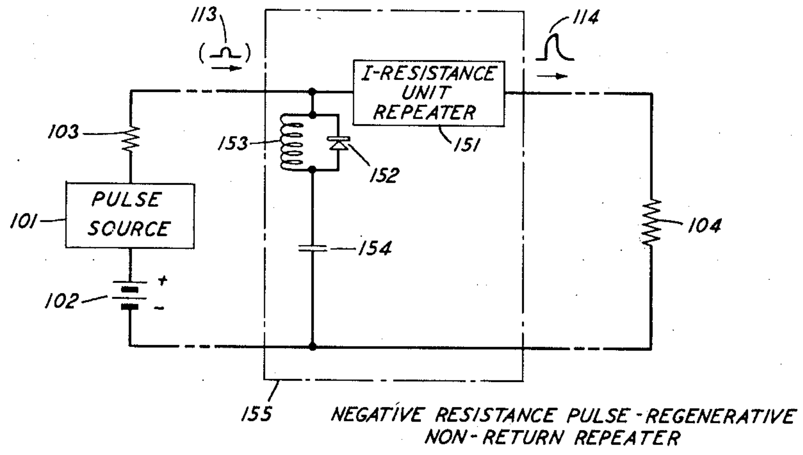
Fig. 14 shows in electrical schematic diagram form a second embodiment of a regenerative "non-return" repeater in accordance with the principles of the invention.

Fig. 14 illustrates another embodiment of the invention wherein the pulse transmitted in the backward direction is suppressed. The loop transmission circuit is similar in all respects to several of those discussed hereinbefore, and corresponding reference numerals have been applied to parts of the circuit of Fig. 14, appearing in the circuits already described above. The non-return repeater 155 comprises an I-type negative resistance unit repeater 151 serially located in the transmission loop and a return pulse suppressor circuit shunted across the line immediately preceding unit 151 on the pulse source side thereof. The suppressor circuit comprises a rectifier or other unilateral conductive device 152 so poled as to short out a negative pulse on the transmission loop without interfering with a positive pulse thereon connected in shunt across the loop.

As illustrated in the drawing, the usual convention employing the arrowhead of 152 to indicate the direction of major forward positive current flow is used. A condenser 154 is interposed in series with rectifier 152 to provide a conduction path for the pulse current without affecting direct current. Inductance 153 is connected in parallel with rectifier 152 to establish a zero potential at direct current across rectifier 152 and to provide a high impedance to the pulse components.

Thus, a positive pulse 113 introduced into the system from source 101 will trigger the I-type negative resistance unit repeater 151, causing its resistance in the loop circuit to suddenly decrease, allowing a momentary increase in the loop current through load 104. This will produce a positive pulse 114 in the forward direction and tend to produce a negative pulse in the backward direction. However, this negative pulse will meet the low shunt impedance of the path comprising rectifier 152 and condenser 154. Condenser 154 will discharge to supply the momentary current needed for the forward pulse 114, and thus, no negative pulse will be transmitted back toward the pulse source end of the line. Condenser 154 will slowly charge again to its initial value through inductance 153.

Figure 15:
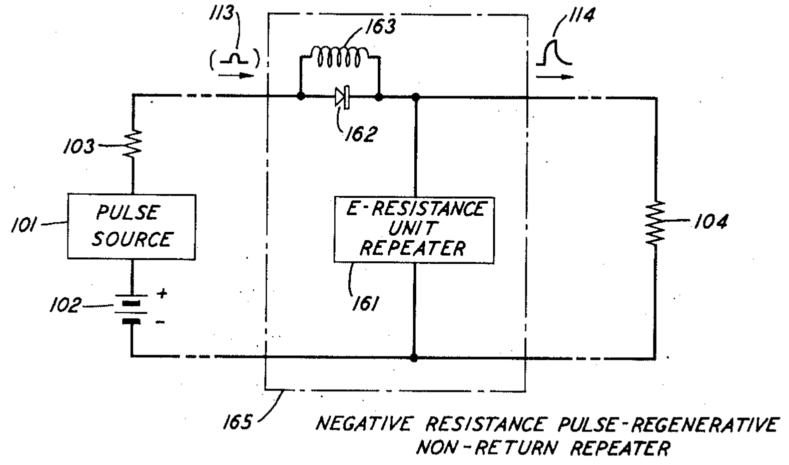
Fig. 15 shows in electrical schematic diagram form a permissible alternative arrangement of the regenerative "non-return" repeater of Fig. 14.

In Fig. 15, a non-return pulse repeater 165 employing a backward pulse suppression circuit and an E-type negative resistance unit 161 is shown. The components comprising the loop transmission circuit are identical to those in Fig. 14 and have therefore been given corresponding reference numerals. Repeater 165 comprises an E-type unit repeater 161 connected across the loop or in shunt therewith and a rectifier 162 serially connected in the line immediately preceding unit 161 on the pulse source side thereof. Rectifier 162 is of such polarity as to transmit a positive voltage pulse in the forward direction along the line. Inductance 163 is connected across rectifier 162 to by-pass direct current and to present a high impedance to pulses.

A positive pulse 113, introduced into the system from source 101, will experience negligible degradation due to the low forward impedance offered by rectifier 162 and will trigger the E-type unit repeater 161. In the manner previously described with reference to Fig 6, this action will produce a positive pulse 114 in the forward direction and would tend to produce a positive pulse in the backward direction from repeater 165. However, the backward directed pulse will be primarily absorbed across the high backward impedance comprising the parallel combination of rectifier 162 and inductance 163 and will therefore experience negligible transmission from repeater 165 back toward the pulse source end of the line.

It is interesting to note the similarity between the non-return repeater of Fig. 8 and the non-return repeater of Fig. 15. In each case, the repeater comprises an E-type unit connected in shunt across the loop transmission system and a non-linear element interposed in serial relation to the loop. In each case, it is the function of the serially connected non-linear element to supply a characteristic necessary to cancel the effect of the shunt unit in the backward direction, thereby maintaining a substantially constant backward current to prevent a pulse from being transmitted in that direction.

A like similarity exists between the non-return repeaters of Fig. 11 and of Fig. 14 in that the triggered unit repeater is connected in series in the loop, and the effect thereof in the backward direction is compensated for by a non-linear element connected in shunt across the loop.

In all cases it is to be understood that the above-described arrangements are illustrative of the application of the principles of the invention. Numerous other arrangements may be devised by those skilled in the art without departing from the spirit and scope of the invention.

What is claimed is:

1. A pulse transmission system comprising a long electrical transmission line, a source of pulses connected across one end of said line, a load circuit connected across the other end of said line, a first negative resistance type element having a voltage versus current characteristic which successively changes from a first positive slope portion to a negative slope portion to a second positive slope portion as the current therethrough is increased, said element being connected at a location between said source and said load in said line, means for supplying direct current through said element of value which biases the operation of said element to a point on said first positive portion of said characteristic immediately below said negative portion whereby a pulse from said source will shift the operation of said element to said negative portion, an oscillatory circuit including an inductance and capacitance electrically connected with said element to shift the operation of said element the extent of said negative resistance portion between said first and second positive portions, a second negative resistance type element having a current versus voltage characteristic which successively changes from a first positive slope portion to a negative slope portion to a second positive slope portion as the voltage thereacross is increased, said second element connected at said location in said line, means for applying a direct potential across said second element of value which biases the operation of said element to a point on said first portion of its characteristic immediately below said negative portion whereby said pulse will shift the operation of said element to said negative portion, and an oscillatory circuit including an inductance and capacitance electrically connected with said second element to shift the operation of said element the extent of said negative resistance portion between said first and second positive portions.

2. The combination in accordance with claim 1, wherein said first negative resistance element is connected in serial relation to said source and said load in said line and wherein said second negative resistance element is connected in shunt relation to said line.

3. The combination in accordance with claim 1, wherein said first negative resistance element is connected in shunt relation to said line and wherein said second negative resistance element is connected in serial relation to said source and said load in said line.

4. A pulse transmission system comprising a long electrical transmission line, a source of pulses connected across one end of said line, a load circuit connected across the other end of said line, means for producing a flow of current along said line and through said source and said load, means responsive to a pulse from said source connected at a location along said line between said source and said load to momentarily vary current flowing through said load, said responsive means comprising a non-linear resistance element and an oscillatory circuit electrically connected to said element, said first non-linear resistance element having a characteristic which comprises a first positive resistance portion and a negative resistance portion and a second positive resistance portion, means for biasing said first element to operate at a point on said first positive resistance portion in proximity to said negative portion whereby said pulse will shift the operating point into said negative portion, means for substantially compensating momentary current change through said source caused by said shift of operation, said compensating means including an element having a non-linear current versus voltage characteristic, both said compensating means and said responsive means being connected at said location in said line, one thereof being connected in serial relation to said line and the other thereof being connected in shunt relation to said line.

5. A pulse transmission system in accordance with claim 4 wherein said responsive means is connected in shunt relation to said line, wherein said compensating means comprises at least one current-controlled type negative resistance element connected in serial relation to said line, and having an oscillatory circuit electrically connected with said negative resistance.

6. A pulse transmission system in accordance with claim 4 wherein said responsive means is connected in shunt relation to said line, wherein said compensating means comprises at least one voltage-controlled type negative resistance element connected in serial relation to said line, and having an oscillatory circuit electrically connected with said negative resistance.

7. A pulse transmission system in accordance with claim 4 wherein said responsive means is connected in serial relation to said line, wherein said compensating means comprises a pair of negative resistance type elements each having a characteristic which comprises a positive resistance portion and a negative resistance portion and a positive resistance portion connected in shunt relation to said line one on either side of said responsive means, and wherein an oscillatory circuit is electrically connected with each of said negative resistance elements.

8. A pulse transmission system in accordance with claim 4 wherein said responsive means is connected in serial relation to said line, and wherein said compensating means comprises a unilateral conductive device connected in shunt relation to said line.

9. A pulse transmission system in accordance with claim 4 wherein said responsive means is connected in shunt relation to said line, and wherein said compensating means comprises a unilateral conductive device connected in serial relation to said line.

10. A pulse transmission system comprising a long electrical transmission line, a source of pulses connected across one end of said line, a load circuit connected across the other end of said line, means for producing a flow of current along said line and through said source and said load, a first non-linear resistance element having a characteristic which comprises a first positive resistance portion and a negative resistance portion and a second positive resistance portion, means for biasing said first element to operate at a point on said first positive resistance portion in proximity to said negative resistance portion whereby a pulse from said source will cause said element to operate in said negative resistance portion, an oscillatory circuit electrically connected with said first element to shift the operation of said element the extent of said negative resistance portion between said first and second positive portions and to return the operation of said element to said point, said first element and said associated oscillatory circuit being connected at a location along said line between said source and said load whereby said shift of operation of said element tends to momentarily change the value of current flowing through said source and said load, means for preventing said shift of operation from substantially changing current flowing through said source, said last-named means including a second non-linear resistance element connected at said location to momentarily change the value of current flowing through said source in a direction opposite to the change caused by said first element, one of said non-linear elements connected at said location in shunt relation to said line, and the other of said non-linear elements being connected in serial relation to said line.

11. A transmission system in accordance with claim 10 wherein said first element is a current-controlled negative resistance element and is connected in serial-relation to said line, wherein said second element is a voltage-controlled negative resistance and is connected in shunt relation to said line, and wherein said last-named means includes an oscillatory circuit associated with said second element.

12. A transmission system in accordance with claim 10 wherein said first element is a current-controlled negative resistance element and is connected in shunt relation to said line, wherein said second element is a voltage-controlled negative resistance and is connected in shunt relation to said line, and wherein last-named means includes an oscillatory circuit associated with said second element.

13. A pulse transmission system comprising an electrical transmission line, a source of pulses connected across one end of said line, a load circuit connected across the other end of said line, a pair of like negative resistance elements each having a voltage versus current characteristic which successively changes from a positive slope to a negative slope to a positive slope, each of said elements being connected in serial relation in said line at a location intermediate said source and said load, means for biasing the operation of both said elements to a point on the positive slope portion of the characteristic of each immediately adjacent to the negative slope portion thereof, a third negative resistance element having a voltage versus current characteristic which successively changes from a positive slope to a negative slope to a positive slope, said third element being connected in shunt relation to said line at a point between said pair, and means for biasing the operation of said third element to a point on the positive slope portion of its characteristic immediately adjacent to the negative slope portion thereof.

14. A pulse transmission system in accordance with claim 13 wherein each of said pair of elements is a current-controlled type of negative resistance and wherein said third element is a voltage-controlled type of negative resistance.

15. A pulse transmission system in accordance with claim 13 wherein each of said pair of elements is a voltage-controlled type of negative resistance and wherein said third element is a current-controlled type of negative resistance.

16. A pulse transmission system comprising an electrical transmission line, a source of pulses connected across one end of said line, a load circuit connected across the other end of said line, a first negative resistance element having a voltage versus current characteristic which successively changes from a positive slope to a negative slope to a positive slope, said element being connected in serial relation in said line at a location intermediate said source and said load, and means for biasing the operation of said first element to a point on the positive slope portion of its characteristic immediately adjacent to the negative slope portion thereof, a pair of like negative resistance elements each having a voltage versus current characteristic which successively changes from a positive slope to a negative slope to a positive slope, each of said elements being connected in shunt relation to said line one on either side of said first element, and means for biasing the operation of both said elements to a point on the positive slope portion of the characteristic of each immediately adjacent to the negative slope portion thereof.

17. A pulse transmission system in accordance with claim 16 wherein said first element is a voltage-controlled type of negative resistance and wherein each of said pair of elements is a current-controlled type of negative resistance.

18. A pulse transmission system in accordance with claim 16 wherein said first element is a current-controlled type of negative resistance and wherein each of said pair of elements is a voltage-controlled type of negative resistance.

MILTON E. MOHR.

No references cited.